United States Patent [19]

Kasugai et al.

[11] Patent Number: 4,795,053
[45] Date of Patent: Jan. 3, 1989

[54] CAP WITH VALVE FOR POSITIVE PRESSURE

[75] Inventors: Joji Kasugai, Ichinomiya; Tamiyoshi Ohashi, Aichi; Satoshi Toki, Inazawa, all of Japan

[73] Assignee: Toyoda Gosei Co., Ltd., Nishikasugai, Japan

[21] Appl. No.: 187,003

[22] Filed: Apr. 27, 1988

[30] Foreign Application Priority Data

May 29, 1987 [JP] Japan ............. 62-085117[U]

[51] Int. Cl.$^4$ ............................................. B65D 51/16
[52] U.S. Cl. ................................. 220/203; 220/303; 220/DIG. 33
[58] Field of Search ........ 220/203, 303, 209, DIG. 33; 137/39, 43

[56] References Cited

U.S. PATENT DOCUMENTS

| | | | |
|---|---|---|---|
| 4,540,103 | 9/1985 | Kasugai et al. | 220/203 |
| 4,572,396 | 2/1986 | Kasugai et al. | 220/203 |
| 4,588,102 | 5/1986 | Kasugai | 220/203 |
| 4,666,056 | 5/1987 | Kasugai et al. | 220/203 |
| 4,676,390 | 6/1987 | Harris | 220/203 |
| 4,684,584 | 8/1987 | Harris | 220/204 |
| 4,716,920 | 1/1988 | Crute | 220/203 |
| 4,724,868 | 2/1988 | Kasugai et al. | 137/516.29 |
| 4,726,488 | 2/1988 | Kasugai | 220/293 |

Primary Examiner—George T. Hall
Attorney, Agent, or Firm—Cushman, Darby & Cushman

[57] ABSTRACT

A cap with valve for positive pressure comprises a cap body installed to an aperture of a container such as a fuel tank or a radiator of an automobile, a partition wall formed within the cap body and extending from an inner circumferential surface in radial direction and having a first fluid flowing hole, and a valve for positive pressure disposed at upper side of the partition wall. A support plate is disposed at lower side of the partition wall within the cap body and provided with a second fluid flowing hole, and an auxiliary valve chamber is formed between the partition wall and the support plate. Within the auxiliary valve chamber, a stopper valve having specific gravity larger than that of liquid within the container and a float having specific gravity of the combined body with the stopper valve smaller than that of the liquid within the container are arranged at lower side of the first fluid flowing hole and movable up and down. When the container is reversed in upper and lower positions, the stopper valve is moved by own weight towards the partition wall thereby the first fluid flowing hole is closed. Also when the liquid level within the container rises, both the stopper valve and the float are floated, and the first fluid flowing hole is closed by the stopper valve. Consequently, the liquid within the container is prevented from passing through the first fluid flowing hole and flowing out of the container.

9 Claims, 6 Drawing Sheets

CAP WITH VALVE FOR POSITIVE PRESSURE

BACKGROUND OF THE INVENTION

The present invention relates to a cap with valve for positive pressure, such as a fuel cap or a radiator cap for automobiles, which is installed to an aperture of a container such as a fuel tank or a radiator and adjusts pressure in the container by flowing fluid such as air out of the container when the pressure in the container is positive.

In the prior art, such a cap with valve for positive pressure, for example, a fuel cap of an automobile (hereinafter referred to simply as "cap") is installed to upper side of a filler pipe being an aperture of a filler tank.

In order to prevent state that fluid rises along an inner circumferential surface of the filler pipe due to rocking of the liquid level within the fuel tank by rapid circling of a vehicle or that the fuel is filled in the filler pipe by reversing upper and lower positions at turning state of the vehicle, or in order to prevent flowing of the fuel from the valve for positive pressure to outside in such state, various mechanisms are arranged in the filler pipe or the cap in the prior art.

In the mechanisms of the prior art, however, corresponding to the case that the fuel rises along the inner circumferential surface of the filler pipe due to rapid circling of the vehicle and the case that the fuel is filled in the filler pipe by reversing upper and lower positions at turning state of the vehicle, prescribed mechanisms are individually installed in the fuel tank, the filler pipe or the cap. That is, one mechanism to treat both cases in the cap has not been provided in the prior art.

SUMMARY OF THE INVENTION

An object of the invention is to provide a cap with valve wherein one cap can treat the case that fuel rises along an inner circumferential surface of a filler pipe without reversing upper and lower positions and the case that the filler is filled in the filler pipe by reversing the upper and lower positions, and the mechanism becomes simple and inexpensive.

The foregoing object can be attained by a cap with valve for positive pressure having a cylindrical cap body installed to an aperture of a container, a partition wall formed on an inner circumferential surface of the cap body and extending inward in radial direction and having a first fluid flowing hole, a valve for positive pressure disposed at upper side of the partition wall within the cap body, lower side of the cap body being installed to side of the container, wherein an auxiliary valve chamber is formed at lower side of the partition wall by a support plate disposed on the inner circumference of the cap body and having a second fluid flowing hole, within the auxiliary valve chamber, a stopper valve having specific gravity larger than that of liquid within the container for closing the first fluid flowing hole by own weight at reversing state of the container in upper and lower positions is disposed at lower side of the first fluid flowing hole and movable up and down, and a float having specific gravity of the combined body with the stopper valve smaller than that of the liquid within the container is disposed at lower side of the stopper valve and movable up and down.

DESCRIPTION OF THE PREFERRED EMBODIMENTS

Figure 1:
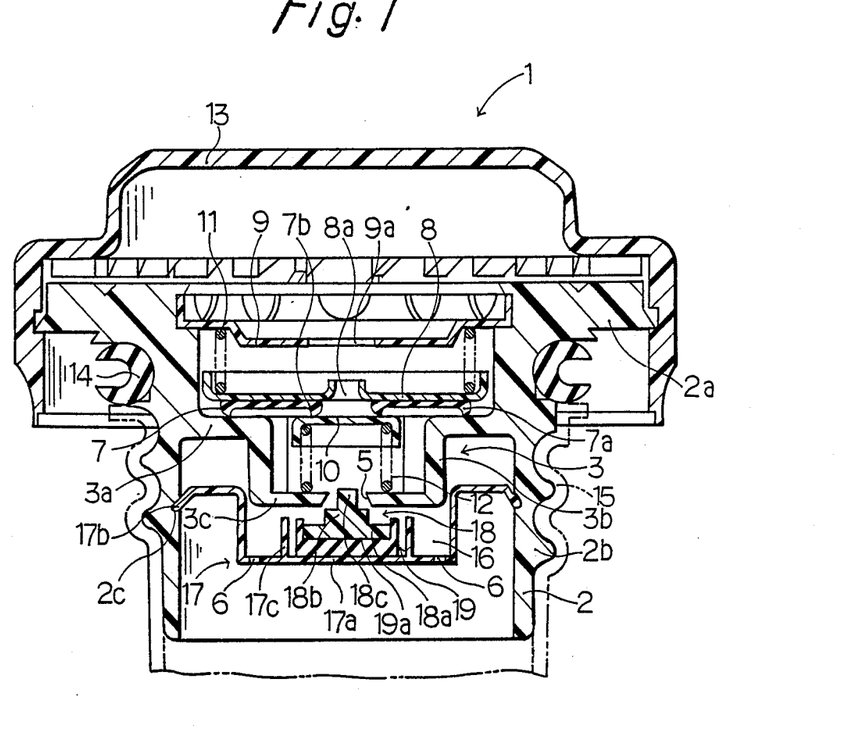
FIG. 1 is a sectional view of a fuel cap as a first embodiment of the invention.

A cap 1 with valve for positive pressure of a first embodiment shown in FIG. 1 is a fuel cap installed on a filler pipe 15 of a fuel tank of an automobile. The cap 1 is provided with a cylindrical cap body 2 made of synthetic resin such as polyacetal, and a disk-shaped upper cover 13 made of synthetic resin such as polyamide is fitted to a flange 2a on upper end of the cap body 2.

On an outer circumferential surface of the cap body 2, a threaded portion 2b for assembling it to the filler pipe 15 is formed, and a seal ring 14 is externally installed to a lower surface of the flange 2a.

On an inner circumferential surface of the cap body 2, a partition wall 3 is formed integrally with the cap body 2. The partition wall 3 is composed of a first lateral plate portion 3a of circular ring form extending from the inner circumferential surface of the cap body 2 towards inside in radial direction, a cylindrical portion 3b extending downward from an inner circumferential edge of the first lateral plate portion 3a, and a second lateral plate portion 3c extending from a lower end of the cylindrical portion 3b towards inside in radial direction. On the center of the second lateral plate portion 3c of the embodiment, a first fluid flowing hole 5 of taper form widened downward.

On the upper surface of the first lateral plate portion 3a of the partition wall 3, a valve body 7 of an elastomer of circular ring form provided with downward lip portions 7a, 7b at outer and inner circumferential edges is installed, and the outer circumferential lip portion 7a at the outer circumferential edge abuts on the upper surface of the plate portion 32. The valve body 7 is bonded to a support plate 8 of disk-like form made of synthetic resin such as polyacetal having a hole 8a on the center.

The holding plate 8 is biased downward by a coil spring 11 with top end abutting on a spring shoe plate 9 of synthetic resin such as polyacetal fitted to upper side of the inner circumferential surface of the cap body 2.

A valve plate 10 of disk-like form made of synthetic resin such as polyacetal abuts on the inner circumferential lip portion 7b at the inner circumferential edge of the valve body 7.

The valve plate 10 is biased upward by a coil spring 12 with bottom end abutting on the upper surface of the second lateral plate portion 3c of the partition wall 3.

By the way, the valve body 7 functions as a valve for positive pressure, when the outer circumferential lip portion 7a is separated from the upper surface of the first lateral plate portion 3a of the partition wall 3 against the biasing force of the coil spring 11 through the support plate 8. Also the valve body 7 functions as a valve for negative pressure, when the valve plate 10 is separated from the inner circumferential lip portion 7b against the biasing force of the coil spring 12.

In the fuel cap 1 of the embodiment, an auxiliary valve chamber 16 is formed by a support plate 17 at lower side of the partition wall 3.

Figure 2:
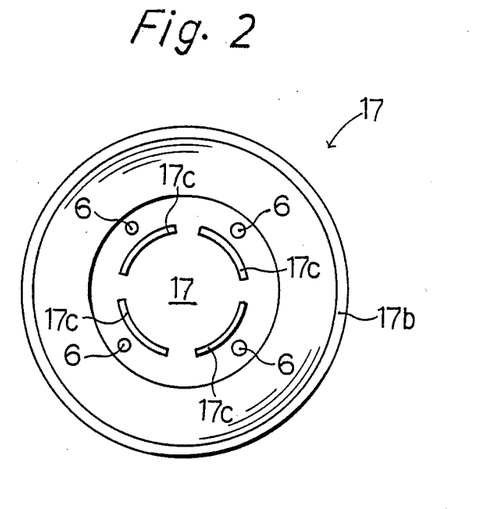
FIG. 2 is a plan view of a support plate in the first embodiment.

The support plate 17 is made of synthetic resin such as polyacetal and has disk-like form, and its center is recessed so as to form a bottom portion 17a and its outer circumferential edge is provided with an engaging poriton 17b annularly. The annular engaging poriton 17b is fitted to an annular groove 2c formed at lower side of the first lateral plate poriton 3a of the partition wall 3 in the inner circumferential surface of the cap body 2, thereby the support plate 17 is assembled to the cap body 2.

Also the support plate 17 is provided with four second fluid flowing holes 6 at prescribed positions near circumferential edge of the bottom portion 17a. The bottom portion 17a is also provided with an annular rib 17c projecting upward to restrict position of a float 19 or the like as hereinafter described. In addition, the rib 17c may be projected downward from the second lateral plate portion 3c of the partition wall 3.

Within the auxiliary valve chamber 16, a stopper valve 18 and a float 19 are arranged to inside of the rib 17c of the support plate 17.

Figure 3:
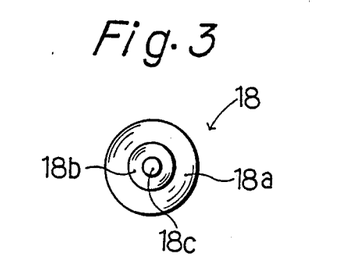
FIG. 3 is a plan view of a stopper valve in the first embodiment.

The stopper valve 18 is made of synthetic resin such as polyacetal and has larger specific gravity than that of the fuel, and a columnar stopper portion 18b is projected from center portion of a columnar base portion 18a. Also at upper side of the stopper portion 18b, a columnar projection 18c is provided so as to prevent the position shift of the stopper valve 18 to the first fluid flowing hole 5.

Figure 4:
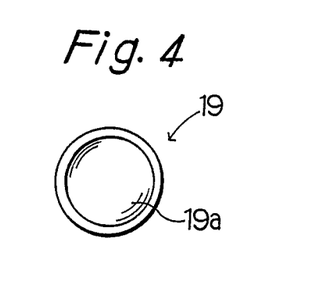
FIG. 4 is a plan view of a float in the first embodiment.

The float 19 is made of foam substance of hard NBR rubber or the like, and when the float 19 is combined with the stopper valve 18 having larger specific gravity than that of the fuel, specific gravity of the combined body as a whole is made smaller than that of the fuel. The float 19 has disk-like form, and a recess 19a for inserting the base portion 18a of the stopper valve 18 is formed on the center of upper side of the float 19.

When the stopper valve 18 and the float 19 are combined and arranged in the auxiliary valve chamber 16 as shown in FIG. 1, in the embodiment, a gap of about 0.5 mm or more is provided between an outer surface of the stopper portion 18b of the stopper valve 18 and an inner circumferential end surface of the first fluid flowing hole 5 in the second lateral plate portion 3c. Also in the embodiment, diameter of the stopper portion 18b of the stopper valve 18 is made larger than that of upper side of the first fluid flowing hole 5 and smaller than that of lower side thereof, so that when the stopper valve 18 is moved to side of the first fluid flowing hole 5 the outer circumferential edge of the upper surface of the stopper portion 18b abuts on the inner circumferential surface in taper form of the second lateral plate portion 3c of the partition wall 3.

Next, assembling mode of the fuel cap 1 of the embodiment will be described.

The bottom end of the coil spring 12 abuts on the upper surface of the second lateral plate portion 3c of the partition wall 3, and the valve plate 10 is arranged to the top end of the coil spring 12. The support plate 8 and the valve body 7 are arranged so that the outer circumferential lip portion 7a of the valve body 7 held to the support plate 8 abuts on the upper surface of the first lateral plate portion 3a of the partition wall 3 and the inner circumferential lip portion 7b thereof abuts on the upper surface of the valve plate 10 respectively. And then the coil spring 11 is arranged on the upper surface of the support plate 8, and the spring shoe plate 9 is fitted to the inner circumferential surface of the cap body 2 from upper side of the coil spring 11.

The stopper valve 18 and the float 19 are arranged at lower side of the first fluid flowing hole 5, and the support plate 17 is arranged at lower side of the float 19, and the engaging portion 17b at the outer circumferential edge of the support plate 17 is fitted to the annular groove 2c of the cap body 2.

And then the seal ring 14 and the upper cover 13 are assembled, thereby assembling work of the fuel cap 1 is finished.

After the fuel cap 1 of the embodiment is installed to the filler pipe 15 of the prescribed fuel tank, when pressure within the fuel tank becomes positive pressure state of prescribed valve or more, the valve body 7 together with the support plate 8 rises against the biasing force of the coil spring 11 thereby the outer circumferential lip portion 7a is separated from the upper surface of the first lateral plate portion 3a of the partition wall 3. The gas such as air within the fuel tank passes through the second fluid flowing hole 6, the auxiliary valve chamber 16 and the first fluid flowing hole 5 of the partition wall 3, and then passes between the first lateral plate portion 3a of the partition wall 3 and the outer circumferential lip portion 7a of the valve body 7, and further passes through the hole 9a of the spring shoe plate 9 and flows out of the fuel tank thereby the pressure within the tank can be adjusted.

When the pressure within the fuel tank becomes negative pressure state of prescribed valve or more, the valve plate 10 drops against the biasing force of the coil spring 12 thereby a gap is produced between the inner circumferential lip portion 7b of the valve body 7 and the valve palte 10. The gas such as air passes through the hole 9a of the spring shoe plate 9, the hole 8a of the support plate 8, the gap between the inner circumferential lip portion 7b and the valve plate 10, the first fluid flowing hole 5 of the partition wall 3 and the auxiliary valve chamber 16, and then passes through the second fluid flowing hole 6 of the support plate 17 and flows into the fuel tank from outside thereby the pressure within the fuel tank can be adjusted.

Figure 5:
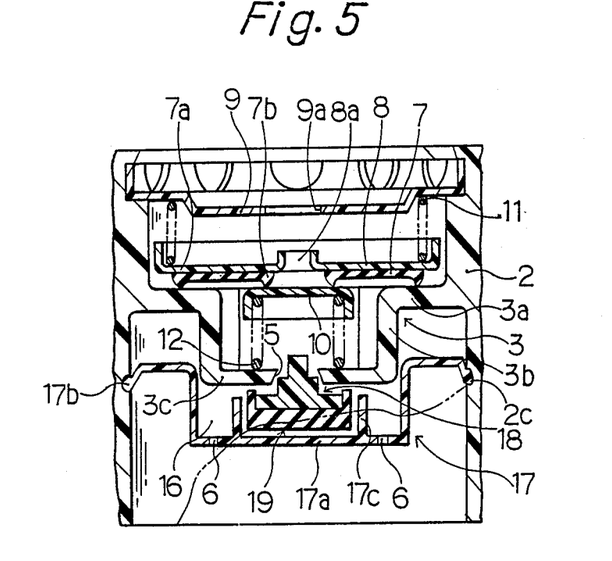
FIG. 5 is a sectional view of main part of the first embodiment where fuel flows into an auxiliary valve chamber without reversing upper and lower positions.

When a vehicle or the like circles rapidly and fuel rises along the inner circumferential surface of the filler pipe 15 due to rocking of the fuel in the fuel tank, it functions as follows (refer to FIG. 5).

Among the fuel rising along the inner circumferential surface of the filler pipe 15, the majority of it rises along the inner circumferential surface of the cap body 2 and abuts on the support plate 17 and drops to side of the filler pipe 15 along which it was advanced, and then is returned. However, some amount of the fuel flows from the second fluid flowing hole 6 of the support plate 17 into the auxiliary valve chamber 16. In this case, since the stopper valve 18 and the float 19 arranged within the auxiliary valve chamber 16 have specific gravity of the combined body of both members smaller than that of the flowing fuel, both the stopper valve 18 and the float 19 float on the fuel and rinse and abut on the inner circumferential surface of the first fluid flowing hole 5 in the partition wall 3 so as to close the first fluid flowing hole 5.

Consequently, even if the fuel flows into the auxiliary valve chamber 16, the first fluid flowing hole 5 is closed by the stopper valve 18 thereby the fuel is prevented from flowing into position where the valve body 7 separated by the partition wall 3 is arranged. The fuel flowing into the auxiliary chamber 16 drops gradually from the second fluid flowing hole 6 of the holding plate 17 and is returned to the fuel tank. Also when surface accuracy of the stopper valve 18 and the inner circumferential surface of the first fluid flowing hole 5 as abutting position of the stopper valve 18 is adjusted, only the gas can pass through the first fluid flowing hole 5.

Figure 6:
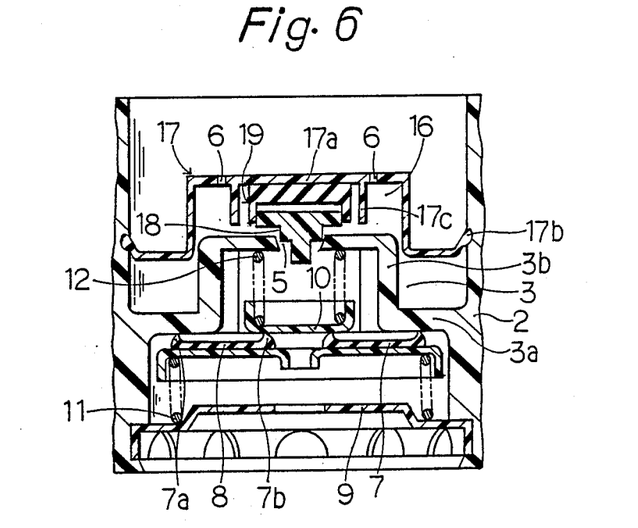
FIG. 6 is a sectional view of main part of the first embodiment where fuel is filled in the auxiliary valve chamber by reversing the upper and lower positions.

When upper and lower positions of the fuel tank are reversed and the fuel is filled in the filler pipe 15, it functions as follows (refer to FIG. 6).

If the upper and lower positions are reversed, the fuel is filled in the filler pipe 15 and flows through the second fluid flowing hole 6 of the support plate 17 into the auxiliary valve chamber 16. However, when the upper and lower positions are reversed, the stopper valve 18 arranged within the auxiliary valve chamber 16 drops by its own weight to side of the first fluid flowing hole 5 of the partition wall 3, and the stopper portion 18b of the stopper valve 18 abuts on the inner circumferential surface of the first fluid flowing hole 5 in the partition wall 3 so as to close the first fluid flowing hole 5. Further, since the stopper valve 18 has larger specific gravity than that of the fuel, even if the fuel is filled in the auxiliary valve chamber 16, the first fluid flowing hole 5 is continued to be closed. Consequently, even if the fuel flows into the auxialiay valve chamber 16, the first fluid flowing hole 5 is closed by the stopper valve 18, and the fuel is prevented from flowing into the position where the valve body 7 separated by the partition plate 3 is arranged.

Accordingly, in the cap 1 of the embodiment, if the fuel rises along the inner circumferential surface of the filler pipe 15 without reversing the upper and lower positions or if the fuel is filled in the filler pipe by reversing the upper and lower positions, passing of the liquid to the position of the valve body 7 can be prevented at any rate. Further, since the prescribed support plate 17, the stopper valve 18 and the float 19 may be only installed, the mechanism becomes simple and inexpensive.

Figure 7:
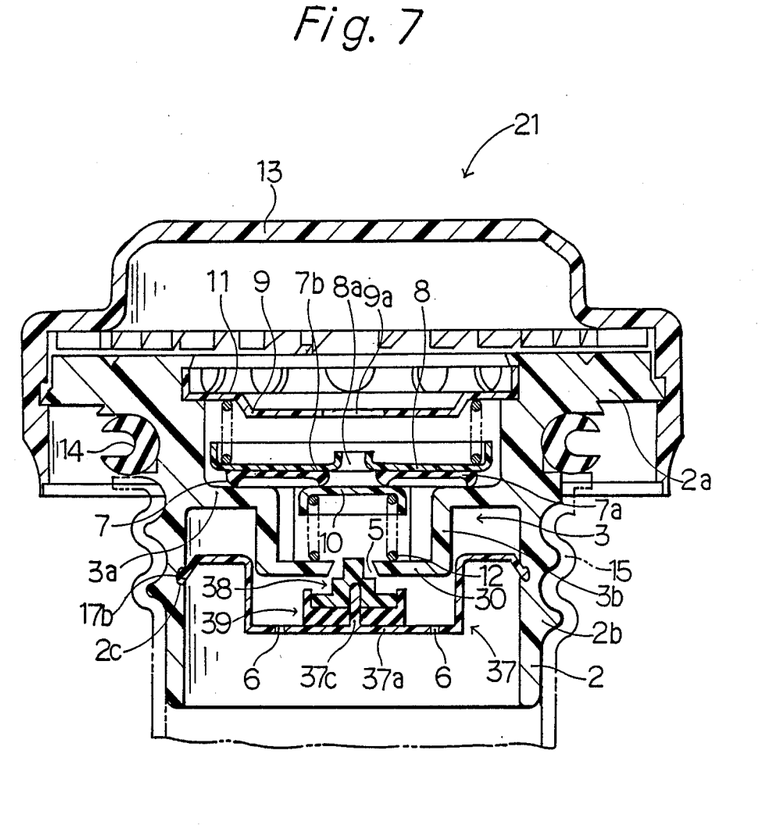
FIG. 7 is a sectional view of a fuel cap as a second embodiment of the invention.

In the first embodiment, in order to restrict position of the stopper valve 18 or the float 19, the holding plate 17 is provided with the annular rib 17c. However, as shown in a fuel cap 21 of a second embodiment in FIG. 7, a rod-shaped rib 37c may be installed at the center of a bottom portion 37a of a support plate 37. The rib 37c is formed in such length that it penetrates a float 39 but does not penetrate a stopper valve 38. Corresponding to the rib 37c, a through hole is formed at the center of the float 39 and a recess is formed at lower side of the center of the stopper valve 38, and the assembling is performed as shown in FIG. 7.

Also in the first embodiment, the stopper portion 18b of the stopper valve 18 abuts on the inner circumferential surface of the first fluid flowing hole 5 in the second lateral plate portion 3c of the partition wall 3 so as to close the first fluid flowing hole 5. However, as shown in a fuel cap 41 of the third embodiment of FIG. 8, a stopper valve 58 may abut on a lower surface of a second lateral plate 3c of a partition wall 3 at a circumferential edge of a first fluid flowing hole 5 so as to close the first fluid flowing hole 5.

Figure 8:
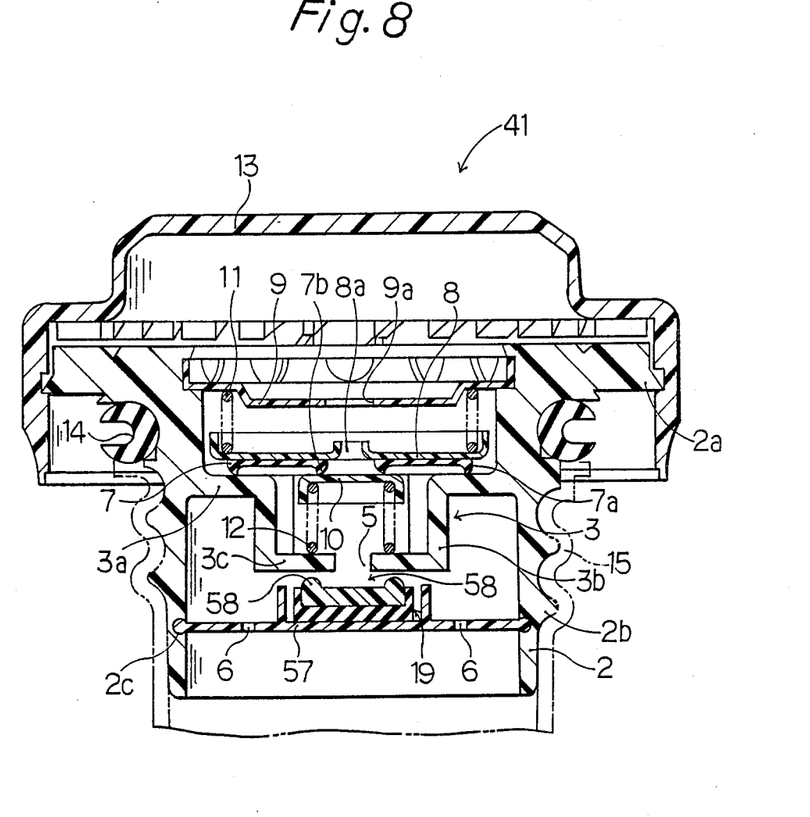
FIG. 8 is a sectional view of a fuel cap as a third embodiment of the invention.

In the third embodiment, the disk-shaped stopper valve 58 is arranged at a recess 19a of a float 19 in similar construction to the first embodiment. An annular lip portion 58b is projected on an upper surface of an outer circumferential edge of the stopper valve 58, and abuts on the lower surface of the second lateral plate portion 3c, of the partition wall 3 so as to close the first fluid flowing hole 5. A support plate 57 also may be of flat plate form.

Further, in the fuel caps 1, 21, 41 of the first~third embodiments, the stopper valves 18, 38, 58 have larger specific gravity than that of the fuel, and the floats 19, 39 having the specific gravity smaller than that of the fuel are arranged at lower side of the stopper valves 18, 38, 58 respectively. However, as shown in a fuel cap 61 of a fourth embodiment of FIG. 9, a stopper valve 68 itself may be formed by a foam substance of hard NBR rubber or the like having small specific gravity than that of the fuel, and a weight 69 made of metal or synthetic resin having larger specific gravity than that of the fuel may be arranged within a recess 68d at lower side of the stopper valve 68. The weight 69 is set so that specific gravity of the combined body of the stopper valve 68 and the weight 69 becomes larger than that of the fuel.

Figure 9:
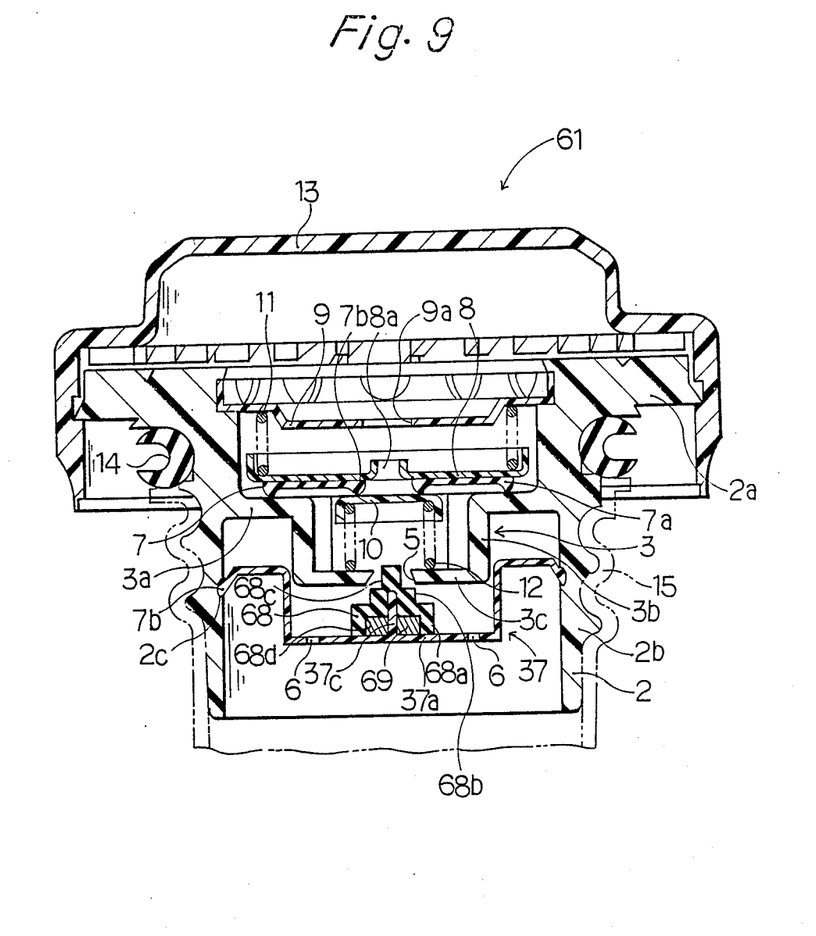
FIG. 9 is a sectional view of a fuel cap as a fourth embodiment of the invention.

The stopper valve 68 is provided with a columnar base portion 68a, a columnar stopper portion 68b projecting upward from the center of the base portion 68a, and a columnar projection 68c projecting upward from the center of the stopper portion 68b. A recess 68d to arrange the weight 69 is formed at a lower surface of the base portion 68a.

The weight 69 is of columnar form, and its center is penetrated by a rib 37c fitted to a stopper portion 68b of a stopper valve 68.

In the fuel cap 61 of the fourth embodiment, when the fuel rises along the inner circumferential surface of the filler pipe 15, only the stopper valve 68 rises by buoyancy so as to close the first fluid flowing hole 5. When the fuel tank is reversed in the upper and lower positions, the stopper valve 68 closes the first fluid flowing hole 5 by own weight of the weight 69 thereby such construction will do.

What is claimed is:
1. A cap with valve comprising:
(a) a cylindrical cap body installed to an aperture of a container;
(b) a partition wall extending from an inner circumferential surface of said cap body in radial direction and having a first fluid flowing hole;
(c) a valve for positive pressure disposed at upper side of said partition wall within said cap body;
(d) a support plate disposed at lower side of said partition wall within the cap body and having a second fluid flowing hole and forming an auxiliary valve chamber to said partition wall;
(e) a stopper valve disposed within said auxiliary valve chamber at lower side of said first fluid flowing hole and being movable up and down and having specific gravity larger than that of liquid within said container for closing said first fluid flowing hole by own weight at reversing state of said container in upper and lower positions; and (f) a float disposed within said auxiliary valve chamber at lower side of said stopper valve and having specific gravity of the combined body with said stopper valve smaller than that of the liquid within said container.

2. A cap with valve as set forth in claim 1, wherein said stopper valve is provided with a columnar base portion, and a columnar stopper portion projecting from center portion of said base portion;

an inner circumferential surface of said first fluid flowing hole is made a taper surface widened downward; and said stopper portion abuts on the inner circumferential surface of said first fluid flowing hole so as to close the first fluid flowing hole.

3. A cap with valve as set forth in claim 1, wherein said float is of disk-like form, and provided at the center of upper portion with a recess for insertion of said stopper valve.

4. A cap with valve as set forth in claim 1, wherein said support plate is of disk-like form, and comprises a bottom portion recessed at the center, a rib projected for positioning said stopper valve and said float by the outer circumference of said float when said stopper valve and said float are held on said bottom portion, a second fluid flowing hole formed at outside of said rib of said bottom portion, and an engaging portion formed on outer circumferential edge thereof.

5. A cap with valve as set forth in claim 1, wherein said stopper valve is provided with a recess at the center of lower portion;

said float is provided at the center with a recess for insertion of said stopper valve and further provided at the center with a through hole; and said support plate comprises a bottom portion recessed at the center, a rib inserted in the recess of said stopper valve and the through hole of said float and projected upward from the center of said bottom portion for positioning said stopper valve and said float, a second fluid flowing hole formed at the circumferential edge of said bottom portion, and an engaging portion formed on outer circumferential edge thereof.

6. A cap with valve as set forth in claim 1, wherein said stopper valve is provided with an annular lip portion projected on an upper surface of outer circumferential edge; and said support plate is of flat plate form, and comprises a rib projected for positioning said stopper valve and said float by the outer circumference of said float when said stopper valve and said float are held at the center, a second fluid flowing hole formed at outside of said rib of said bottom portion, and an engaging portion formed on outer circumferntial edge thereof.

7. A cap with valve comprising:

(a) a cylindrical cap body installed to an aperture of a container;

(b) a partition wall extending from an inner circumferential surface of said cap body in radial direction and having a first fluid flowing hole;

(c) a valve for positive pressure disposed at upper side of said partition wall within said cap body;

(d) a support plate disposed at lower side of said partition wall within the cap body and having a second fluid flowing hole and forming an auxiliary valve chamber to said partition wall;

(e) a stopper valve disposed within said auxiliary valve chamber at lower side of said first fluid flowing hole and being movable up and down and having specific gravity smaller than that of liquid within said container for closing said first fluid flowing hole; and (f) a weight disposed within said auxiliary valve chamber at lower side of said stopper valve and having specific gravity of the combined body with said stopper valve larger than that of the liquid within said container.

8. A cap with valve as set forth in claim 7, wherein said stopper valve is provided with a columnar base portion, and a columnar stopper portion projecting from center portion of said base portion;

an inner circumferential surface of said first fluid flowing hole is made a taper sureface widened downward; and said stopper portion abuts on the inner circumferential surface and said first fluid flowing hole so as to close the first fluid flowing hole.

9. A cap with valve as set forth in claim 7, wherein a recess is formed at lower side of said stopper valve, and said weight is disposed on said recess.

* * * * *